(12) United States Patent
DiLorenzo (10) Patent No.: US 6,256,554 B1
(45) Date of Patent: Jul. 3, 2001

(54) MULTI-ROOM ENTERTAINMENT SYSTEM WITH IN-ROOM MEDIA PLAYER/DISPENSER

(76) Inventor: Mark DiLorenzo, P.O. Box 1207, Laguna Beach, CA (US) 92652

( * ) Notice: Subject to any disclaimer, the term of this patent is extended or adjusted under 35 U.S.C. 154(b) by 0 days.

(21) Appl. No.: 09/292,839

(22) Filed: Apr. 14, 1999

(51) Int. Cl.$^7$ ................................................ C06F 17/00
(52) U.S. Cl. ........................................ 700/236; 700/234
(58) Field of Search .................................. 700/231, 234, 700/236, 241; 221/2, 7

(56) References Cited

U.S. PATENT DOCUMENTS

| | | |
|---|---|---|
| 4,414,467 | 11/1983 | Gould et al. . |
| 4,528,643 | 7/1985 | Freeny, Jr. . |
| 4,553,211 | 11/1985 | Kawasaki et al. . |
| 4,905,280 * | 2/1990 | Wiedemer ............................ 700/341 |
| 5,150,817 | 9/1992 | Livingston . |
| 5,219,094 | 6/1993 | Labriola . |
| 5,339,250 | 8/1994 | Durbin . |
| 5,355,302 * | 10/1994 | Martin et al. ......................... 700/231 |
| 5,415,319 | 5/1995 | Risolia . |
| 5,445,295 | 8/1995 | Brown . |
| 5,633,839 | 5/1997 | Alexander et al. . |
| 5,647,505 | 7/1997 | Scott . |
| 5,734,719 * | 3/1998 | Tsevdos et al. ...................... 380/5 X |
| 5,748,485 | 5/1998 | Christiansen et al. . |
| 5,769,269 | 6/1998 | Peters . |
| 5,781,889 * | 7/1998 | Martin et al. ..................... 700/341 X |
| 5,794,217 * | 8/1998 | Allen ................................ 700/341 X |
| 5,831,862 | 11/1998 | Hetrick et al. . |
| 5,848,398 * | 12/1998 | Martin et al. ..................... 700/234 X |
| 5,959,945 * | 9/1999 | Klieman ........................... 700/241 X |

OTHER PUBLICATIONS

Communication from European Patent Office re search report—Documents Considered to be Relevant, (Sep. 30, 1999).

* cited by examiner

Primary Examiner—Christopher P. Ellis
Assistant Examiner—Gene O. Crawford
(74) Attorney, Agent, or Firm—Fulwider Patton Lee & Utecht, LLP (57) ABSTRACT

A plurality of acquisition media is stored at each of a plurality of in-room systems. A plurality of access-only media is stored at a single head-end system. Each in-room system has access to each of the access-only media. Access to and acquisition of media are recorded at the head-end system and any associated charges for the access and/or acquisition are determined at the head-end system. A free check-out time prior to being charged for an acquisition of media and a free sample time prior to being charged for access to a media are provided. The acquisition media includes devices for storing audio data, such as CDs, DATs, mini discs and cassettes. The access-only media comprises audio data stored on a CD and/or an audio card have memory. The acquisition media may also include devices for storing audio/video data while the access-only media comprises audio/video data.

19 Claims, 6 Drawing Sheets

MULTI-ROOM ENTERTAINMENT SYSTEM WITH IN-ROOM MEDIA PLAYER/DISPENSER

BACKGROUND OF THE INVENTION

1. Field of the Invention

This invention relates generally to entertainment systems, and more particularly, to an entertainment system, including one or more media players/dispensers, for use in a multi-room complex such as a hotel. "Media" as used within the context of this disclosure includes audio and/or video data stored in the entertainment system that is accessible through the media player. This media is referred to as "access-only" media. As used within the context of this disclosure, "media" also includes tangible devices on which audio and/or video data is carried. For example, audio acquisition media may include compact discs (CDs), digital audio tape (DAT), mini discs, audio cassettes, while video acquisition media may include digital video discs (DVDs), video games and video cassettes. This type of media is referred to as "acquisition" media and is acquired through the media dispenser. Acquisition media further includes other forms of digital data such as computer software.

2. Description of Related Art

In-room hotel entertainment is typically limited to video entertainment such as cable TV, satellite TV and pay-per-view movies. For those desiring alternate forms of entertainment, such as music and talk radio, resort must be had to generally poor quality radios having poor quality radio reception and sound. In addition, should a guest desire to listen to a full-length recording by one or more artists they must travel not only with a collection of media, such as CDs, but also with a media player, such as a CD player. This is very inconvenient for the hotel guest.

While staying in a hotel, should a guest happen to hear a musical recording and decide to purchase a CD including the recording, he must locate a music store, often not an easy task for an out-of-town guest unfamiliar with the surroundings, and then travel to the music store. This too is inconvenient for the hotel guest.

Hence, there has been a long existing need in the art for a hotel entertainment system that provides hotel guests with quality audio entertainment, including a collection of selectable full-length recordings, which they may access within their rooms and be charged accordingly. There has also been a need for providing in-room acquisition of tangible media, such as CDs. The present invention fulfils all of these needs and others.

SUMMARY OF THE INVENTION

Briefly, and in general terms, the present invention is directed to an entertainment system, including one or more media players/dispensers, for use in a multi-room complex such as a hotel.

In a first aspect, the invention is related to a method of providing media to a plurality of in-room systems from a head-end system remote from the plurality of in-room systems. The method includes the steps of storing a plurality of acquisition media at each of the in-room systems and storing a plurality of access-only media at the head-end system. The method also includes the steps of, at each in-room system, providing access to each of the access-only media to assist the user in media acquisition choices and recording the acquisition of any of the media at the head-end system.

In an additional facet of the invention, the acquisition media includes devices for storing audio data and the access-only media comprises audio data. In another facet, the acquisition media devices comprise any one of a CD, DAT, mini disc and cassette. In further aspects of the invention the access-only media is stored on a CD and/or the access-only media is stored in an audio card have memory. In another aspect, the acquisition media comprises devices for storing audio/video data and the access-only media comprises audio/video data. In a further aspect of the invention, the step of recording the acquisition of any of the acquisition media includes the steps of, at the in-room system, sensing the removal of one of the acquisition media, storing an acquisition signal encoded with a room identifier and a media acquisition identifier at the in-room system, transmitting the acquisition signal to the head-end system and processing the acquisition signal to determine any charge associated with the acquisition. In yet another aspect of the invention the, method of providing media includes the step of recording the access of any of the access-only media. In still a further facet, the step of recording the access of any of the access-only media includes the steps of, at the in-room system, sensing the access to one of the access-only media, storing an access signal encoded with a room identifier and a media acquisition identifier at the in-room system, transmitting the access signal to the head-end system and processing the access signal to determine any charge associated with the access.

In a second aspect, the invention is related to a method of providing access-only media to a plurality of in-room systems from a head-end system remote from the plurality of in-room systems and tracking the access to the access-only media. The method includes the steps of storing a plurality of access-only media at the head-end system and transmitting each of the access-only media over a communications line at a unique frequency. The method also includes the steps of, at each in-room system, providing access to the communication line through a frequency tuner for adjustably tuning to one of the unique frequencies and recording the access of any of the access-only media at the head-end system.

In a third aspect, the invention is related to a method of providing access-only media to a plurality of in-room systems from a remote master site through a plurality of head-end systems. The method includes the steps of storing a plurality of periodically updated access-only media at the remote master site and periodically downloading the access-only media to the plurality of head-end systems over a first communications network. The method also includes the steps of, at each of the head-end systems, transmitting each of the access-only media over a second communications network at a unique frequency and at each in-room system, providing access to the communication line through a frequency tuner for adjustably tuning to one of the unique frequencies. The method further includes the step of recording the access of any of the access-only media at the head-end system.

These and other objects, aspects and advantages of the present invention will become apparent from the following more detailed description, when taken in conjunction with the accompanying drawings which illustrate, by way of example, the preferred embodiments of the invention.

DETAILED DESCRIPTION OF THE PREFERRED EMBODIMENTS

Figure 1:
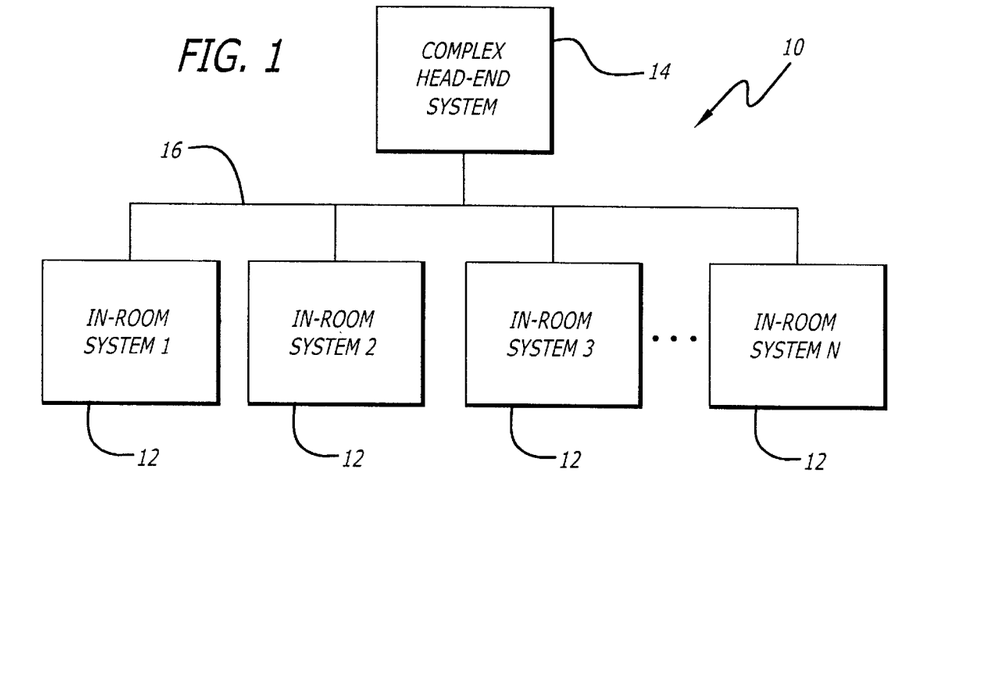
FIG. 1 is a block diagram of a multi-room entertainment system in accordance with the invention including a head-end system and a plurality of in-room systems interfaced though a communications line.

Referring now to the drawings, wherein like reference numerals among the several figures correspond to like elements, and more particularly to FIG. 1, the multi-room entertainment system 10 includes a plurality of in-room systems 12, located within several rooms of a given complex. For ease in describing the invention, the complex will be referred to a hotel. The invention, however, is in no way limited to use in hotels. In FIG. 1, only four in-room systems 12 are shown. There may, however, be more or less in-room systems 12 depending on the particular requirements of a hotel. For example, some hotels may choose to place an in-room system 12 in every room while other hotels may select specific rooms for system installation.

Each in-room system 12 is linked to the head-end system 14. This link may occur through any given network line 16 depending on the infrastructure of the hotel. For example, typical hotels have an RF coaxial cable system already installed which provides signals from the hotel's master antenna television (MATV) system. The multi-room entertainment system 10 may take advantage of existing networks and connect the individual in-room systems 12 to the head-end system 14 through such networks. In tying the entertainment system into the MATV system, the present invention may supplement its media with additional media available over the MATV.

Figure 2:
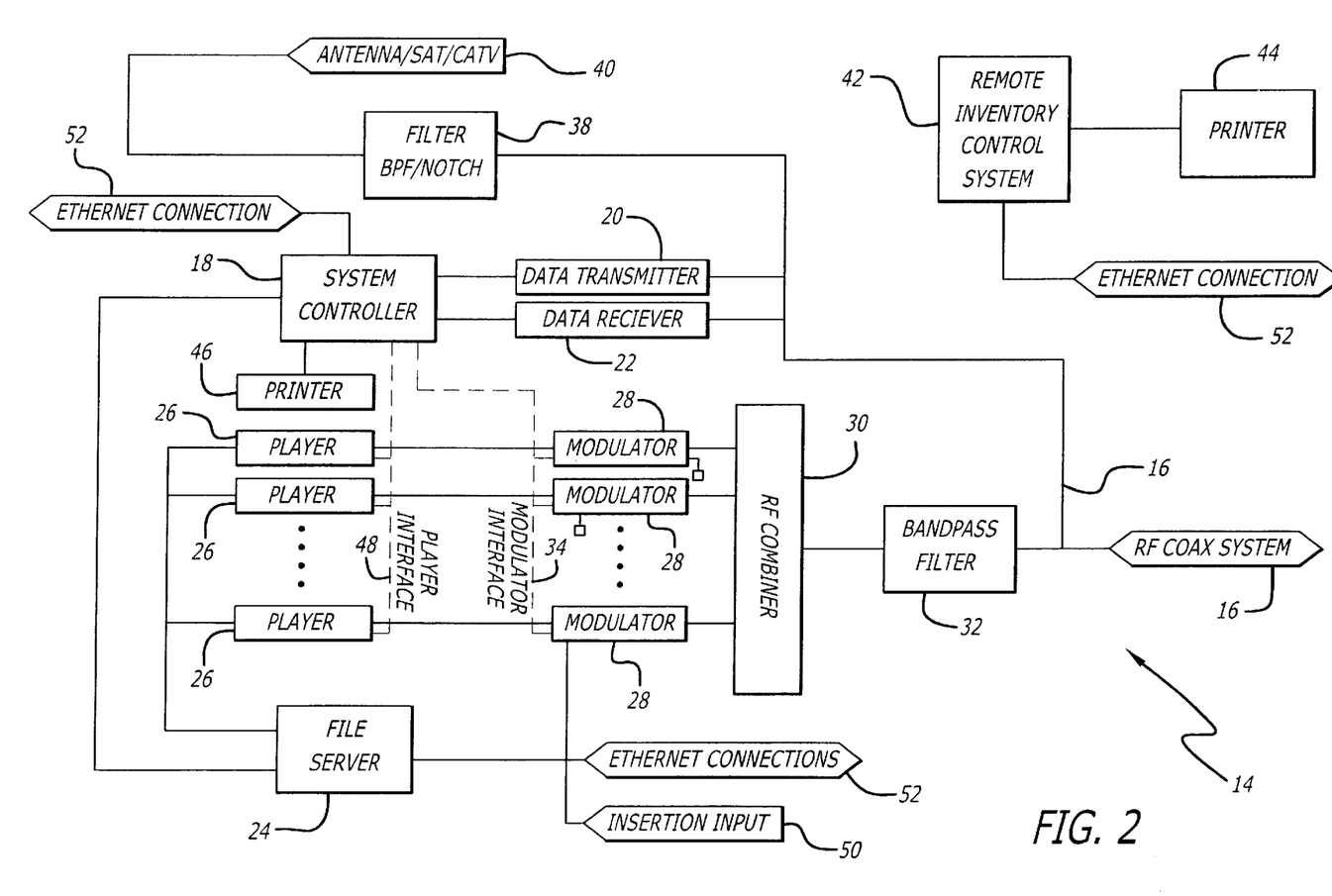
FIG. 2 is a detailed block diagram of the head-end system of FIG. 1.

As shown in FIG. 2, one embodiment of the head-end system 14 includes a system controller 18. The system controller 18 communicates with the in-room systems (not shown) through a data transmitter 20 and a date receiver 22. The transmitter 20 transmits data to the in-room systems 12, while the data receiver 22 receives data from the in-room systems. Communication between the transmitter 20 and the receiver 22 and the in-room systems 12 occurs through the RF coax system 16. The head-end system 14 also includes a file server 24, a plurality of players 26, a corresponding plurality of modulators 28, an RF combiner 30 and a bandpass filter 32.

In a preferred embodiment of the invention, the players 26 comprise individual personal computers (PC) having audio cards and/or video cards for storing media accessed from the file server 24. These players 26 may have from one to four output channels. In another embodiment, the players 26 comprise audio media players, such as CD, DAT and/or mini disc players and/or video media players such as DVD or VCR players. The head-end system 14 may include a number of players 26 that continuously play media for transmission over the RF coax system 16. These players 26 are referred to as "continuous-play" players. The head-end system 14 may also include a number of players 26 that play media only when requested to do so. These players 26 are referred to as "on-demand" players. The number of on-demand players included in the head-end system 14 does not necessarily equal the number of in-room systems 12, less may be provided depending on the demand for use placed on the system. The head-end system 14 may include both continuous-play players and on-demand players. Each player 26 has a unique frequency of transmission and thus comprises one channel of the entertainment system 10. Each player 26 is also accessible by the system controller 18 through a player interface 48.

Associated with each player 26 is a modulator 28. The modulators 18 are responsive to the signals from the players 26 and modulate these signals for transmission over the RF coax system 16 in a predetermined modulation scheme. For example, in one embodiment of the invention, the modulators 28 are FM modulators and the signals are transmitted at frequencies within the FM radio band. Any other type of modulators/modulation schemes may be used to transmit the signals at frequencies within the RF band. The transmission frequency of each modulator 28 may be fixed or may be set by the system controller 18 over the modulator interface 34. The signals from the modulators 28 are received by the RF combiner 30 and pass through the bandpass filter 32 before being transmitted over the RF coax system 16.

The head-end system 14 also includes a filter 38 for filtering the signals from the MATV system 40 to prevent interference with the access-only media signals provided by the players 26. Also included in the head-end system 14 is a remote inventory control system 42 with an attached printer 44. The system controller 18 is also provided with a printer 46. The head-end system 14 further includes an insertion input 50 which provides an access-only media feed to the modulators 28. Although the feed is only shown going to one of the modulators 28, the feed may be provided to additional modulators. The access-only media provided over the insertion input 50 may include hotel announcements and/or advertisements. At the modulators 28, the insertion media interrupts the player media and is fed over the RF coax system 16, in place of the player media, to the active in-room systems 12. The system controller 18, file server 24 and remote inventory control system 42 interface with each other through an Ethernet connection 52. The system controller 18 may route information to other computers such as the hotel property management system (HPMS) (not shown) and the system operators offices (not shown).

Figure 3:
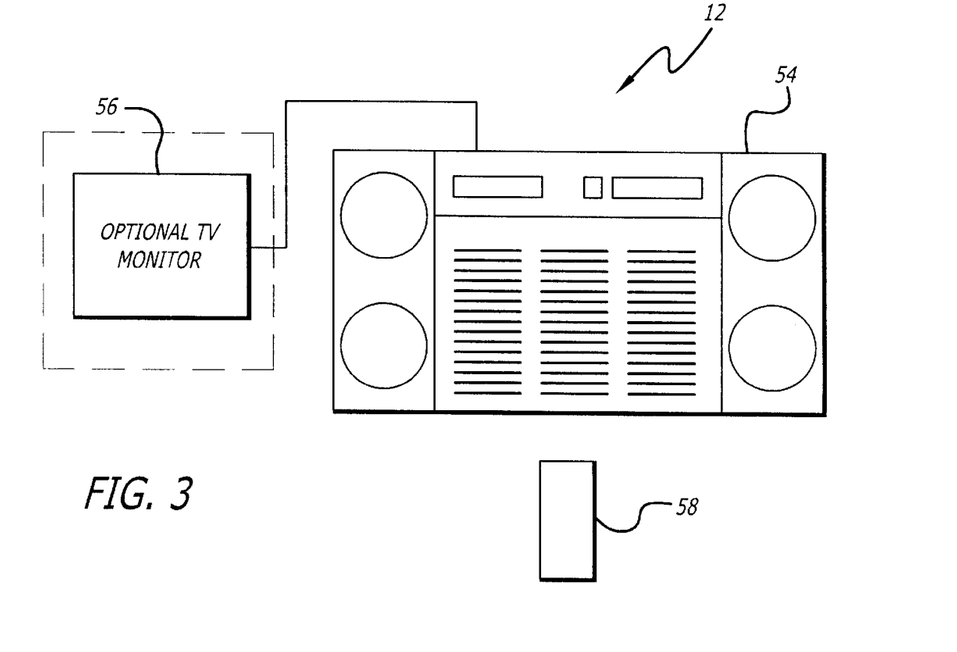
FIG. 3 depicts hardware components of the in-room system of FIG. 1 including a media player/dispenser, a video monitor and a remote control.
Figure 4:
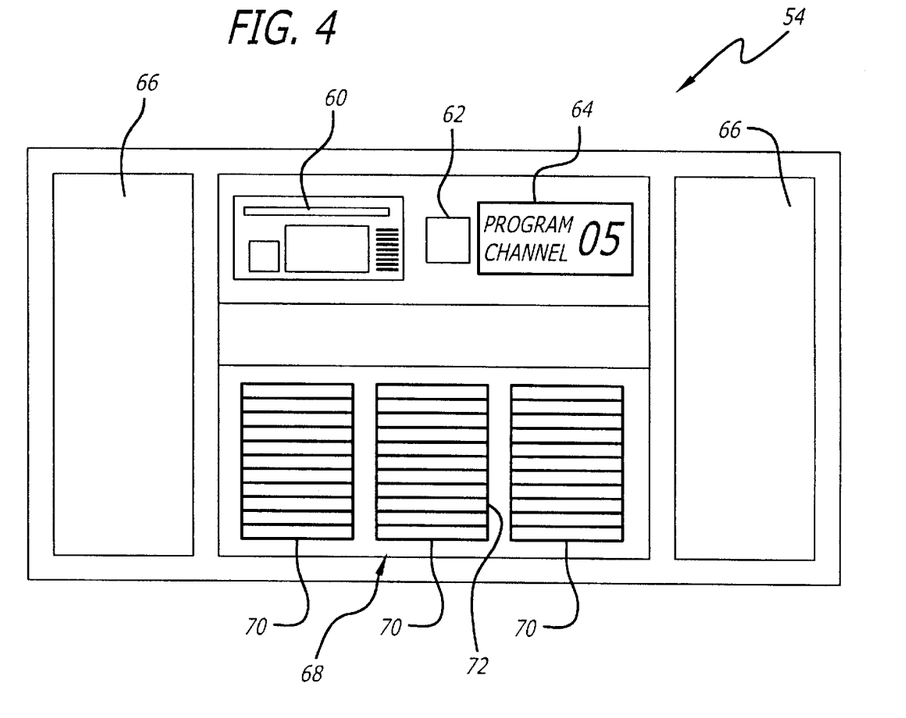
FIG. 4 depicts components of the media player/dispenser of FIG. 3 including a CD player, a CD dispenser, a pair of speakers and a display.

As shown in FIG. 3, the in-room system 12 includes a media player/dispenser 54, a video monitor 56 and remote 58. In an alternate embodiment of the invention, the in-room system 12 may provide access to audio media only, in which case, the video monitor 56 is absent from the in-room system. With reference to FIG. 4, the media/player dispenser 54, in one configuration, includes a CD player 60, a control panel 62, a display 64, right and left speakers 66 and a media dispenser 68.

The media dispenser 68 includes a front door (not shown) behind which are three parallel vertical storage cabinets 70. Each individual cabinet has a plurality of slots 72, each capable of holding a piece of acquisition media to be dispensed, such as CDs. In alternate configurations the media dispenser 68 may be in a carousel or horizontal configuration. Different types of acquisition media may be held in the various cabinet styles. The media dispenser 68 also includes sensors (not shown) that monitor the removal of the acquisition media. Other sensors monitor the open-closed state of the door and the locked-unlocked state of the media dispenser 68. A light may be includes to illuminate the acquisition media. The light may be operated by the system controller 18 (FIG. 2) or under manual control such as the open state of the door or a manual switch. The media dispenser 68 (FIG. 4) may also include a credit card swipe, which in conjunction with the RF coax system, may allow for user purchases through the system controller 18.

Figure 5:
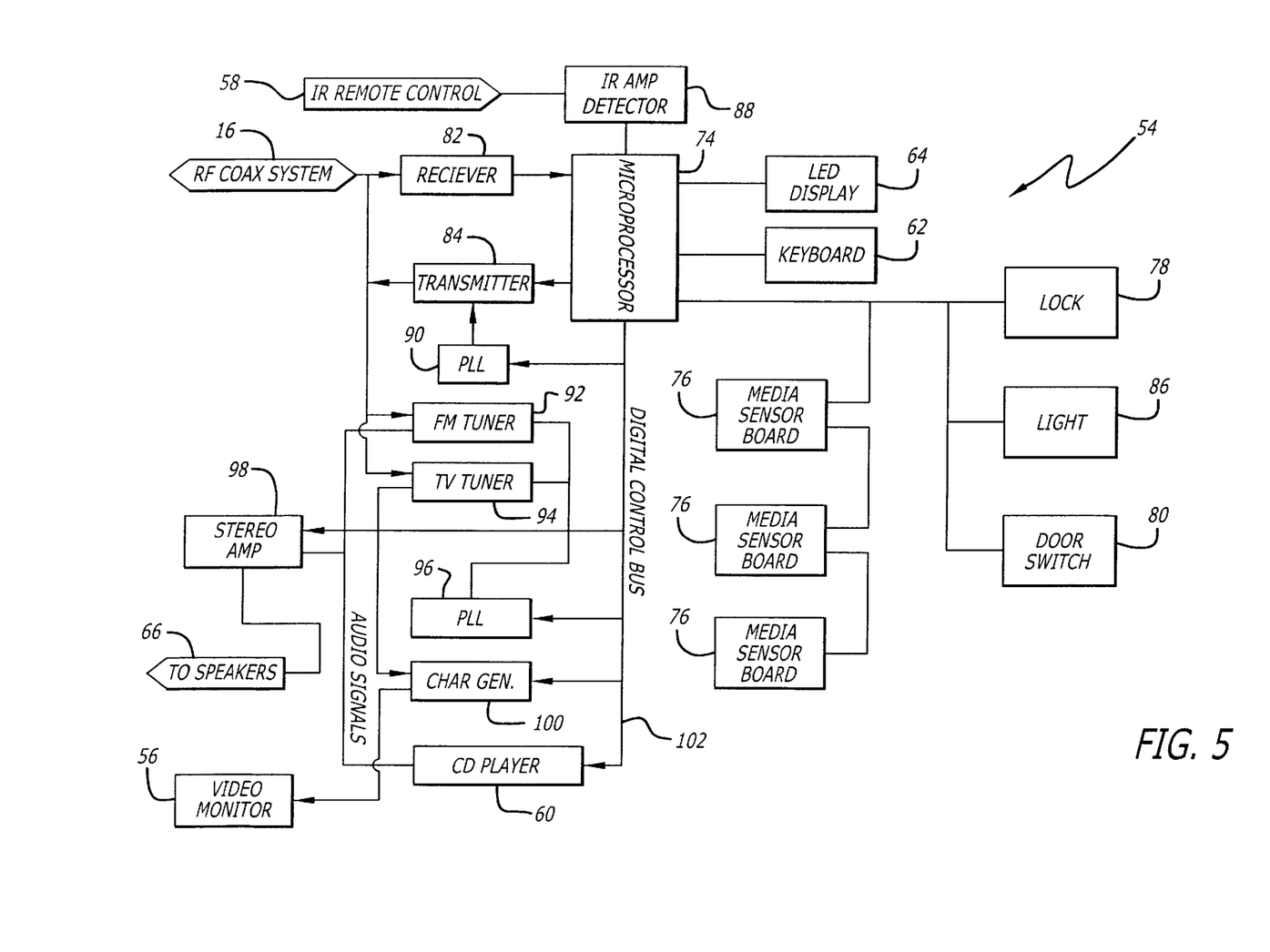
FIG. 5 is a detailed block diagram of the media player/dispenser of FIG. 3.

As shown in FIG. 5, the media player/dispenser includes a microprocessor 74 that receives signals from the media sensors 76, the lock 78 and door switch 80 for monitoring the opened-closed and locked-unlocked states of the media dispenser cabinet door and for sensing the presence or absence of the acquisition media within the cabinets 70 (FIG. 4). The microprocessor 74 (FIG. 5) also communicates with the system controller 18 through the RF coax system 16. This communication takes place through a receiver 82 and a transmitter 84. In one configuration of the media player/dispenser 54 the receiver 82 is a frequency shift keying (FSK) receiver and the transmitter 84 is a 8–13 MHz transmitter. The receiver 82 may be programmed to receive specific channels. For example, if the in-room system 12 includes a video monitor, the receiver may be programmed to receive MATV system channels as well as the entertainment system 10 channels. The transmitter 84 has an associated phase lock loop (PLL) 90 for setting the frequency of the transmitter under command from the microprocessor 74.

Figure 6:
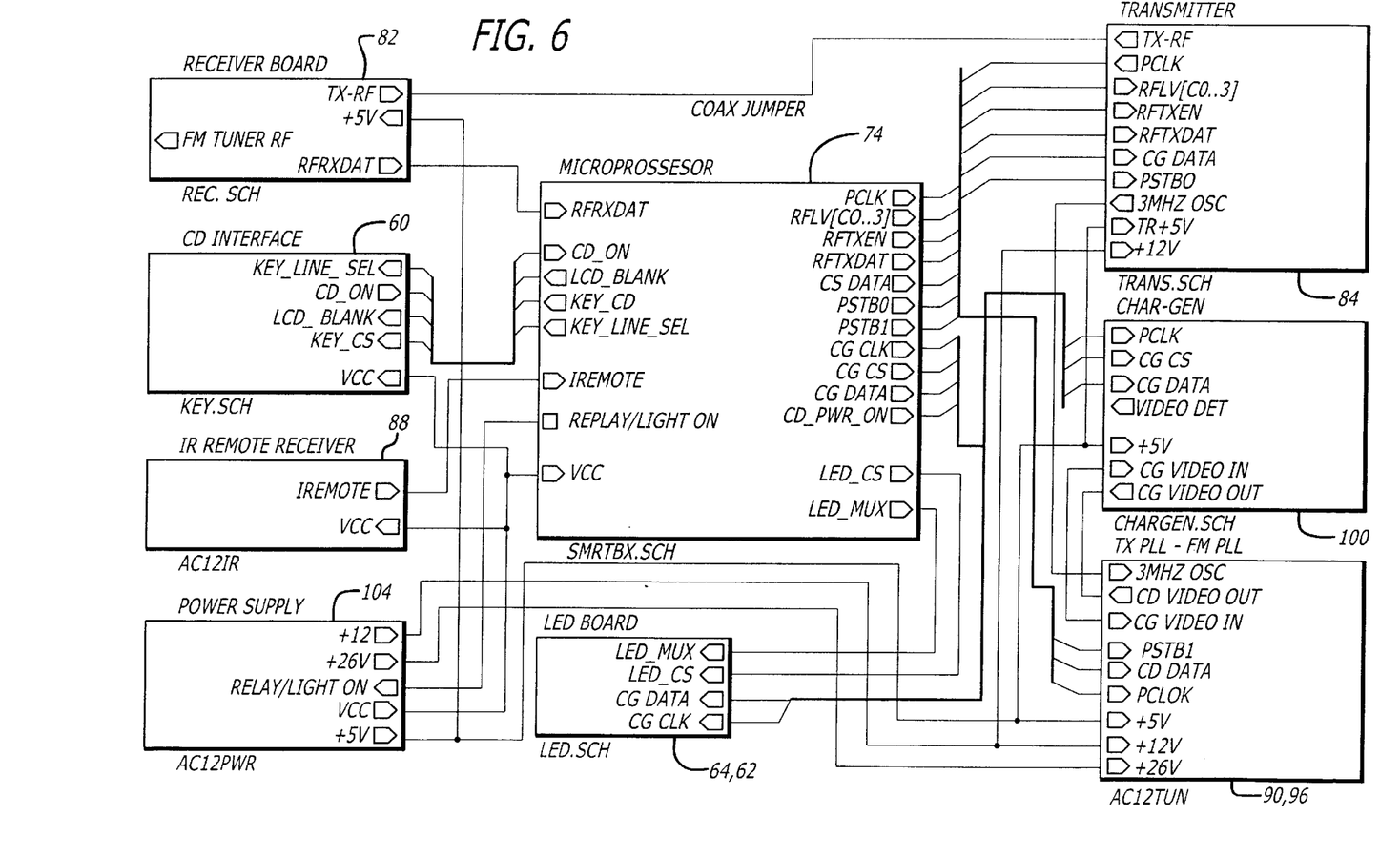
FIG. 6 is a further detailed block schematic diagram of aspects of the media player/dispenser of FIG. 5.

The media player/dispenser 54 also includes an IR amp detector 88 for receiving signals from the remote control 58. Further included are an FM tuner 92 and a TV tuner 94 with an associated PLL 96. The FM tuner 92 is tuned to receive audio data from the head-end system 14 over the RF coax system 16 while the TV tuner is tuned by the PLL to receive A/V data from the head-end system and/or the MATV system. By tuning for the MATV system channels, the entertainment system 10 may be configured to function as a pay-per-view movie system. Each tuner 92, 94 forwards audio data to the stereo amplifier 98. The TV tuner 94 also forwards video data to the character generator 100 which, in turn, forwards data to the video monitor 56. The microprocessor 74 provides control signals to the PLLs 90, 96, the character generator 100, the CD player 60 and the stereo amplifier 98 over a control bus 102. Details of the interconnection between the microprocessor 74 and other media player/dispenser 54 components are shown in FIG. 6.

As previously mentioned, access-only media is stored at a central site, i. e., the head-end system 14. The type of access-only media provided and the user cost, if any, for such media is entirely dependent on the requirements and objectives of the hotel management. Access-only media may include full-length musical recordings by a wide variety of artists. For example, in one configuration of the system, one hundred full-length recordings are available for selection by the user. Access-only media may also include compilation musical recordings that include a number of sample tracks selected from a number of different full-length recordings. These compilation recordings are usually genre specific, e. g., country, top 40, classical, easy listening, jazz/blues, family, and may include entire tracks or edited versions of selected sample tracks. The compilations may further include a narrative providing information on the sample and the artist or may include artist interviews. Access-only media may also include purely narrative media such as book readings, educational programs and adult programs. Access-only media may also include movies.

Some of the access-only media is continuously available over the system through the continuous-play players, each at a unique frequency. This access-only media is referred to as "continuous" access-only media. Thus, in essence, the system 10 provides closed-circuit radio programming that is available to all users at all times. In one configuration of the system 10 the continuous access-only media includes the genre-specific media. The remaining access-only media is available only on demand by a user. This access-only media is referred to as "on-demand" access media. Depending on the configuration of the system 10, specifically the number of on-demand players, the availability of on-demand access media may be limited. If all players are in use, the user may be instructed to try their selection at a later time.

As a means of generating additional revenue, hotel management may charge users for accessing the access-only media. Such charges may be based on duration of access, e.g. 10 cents/minute, $5.00/hour, etc., or on a flat fee, regardless of the duration of access. In the case of continuous access-only media, additional revenue may be obtained through the inclusion of advertising in the programming.

With regard to acquisition media, the type of media included in the in-room systems 12 depends on the demand for the media. The acquisition media typically includes full-length musical recordings by a variety of artists from a variety of genres. The genres represented in the acquisition media may vary depending on the location of the hotel and the demographics of the hotel guests. As a means of promoting the purchase of acquisition media, some of the access-only media, specifically the genre-specific compilations, may include samples of recordings from some of the full-length acquisition media. In addition, some of the acquisition media may be available in the on-demand access media. Thus the user is afforded an opportunity to listen to a full-length recording prior to making a purchasing decision. While the foregoing discussion of access-only media and acquisition media has centered on musical and narrative recordings, entertainment systems 10 in accordance with the invention may provide other types of media such as movies and video games.

In operation, the system 10 may have two modes of operation, a normal mode and an interactive mode. In the normal mode of operation the user generally accesses continuous access-only media, while in the interactive mode the user generally accesses on-demand access media.

Upon power on of the in-room system 12, the system 10 is in the normal mode of operation. The FM tuner 92 in the media player/dispenser 54 is automatically tuned to receive audio data from one of the continuous-play players. This audio data may comprise a welcome message from the hotel. Because this audio data is stored in one of the continuous-play players, a user may not always access the data as the beginning. The data, however, is of limited duration and the user may hear the entire data by allowing the data to repeat itself from the beginning.

Figure 7:
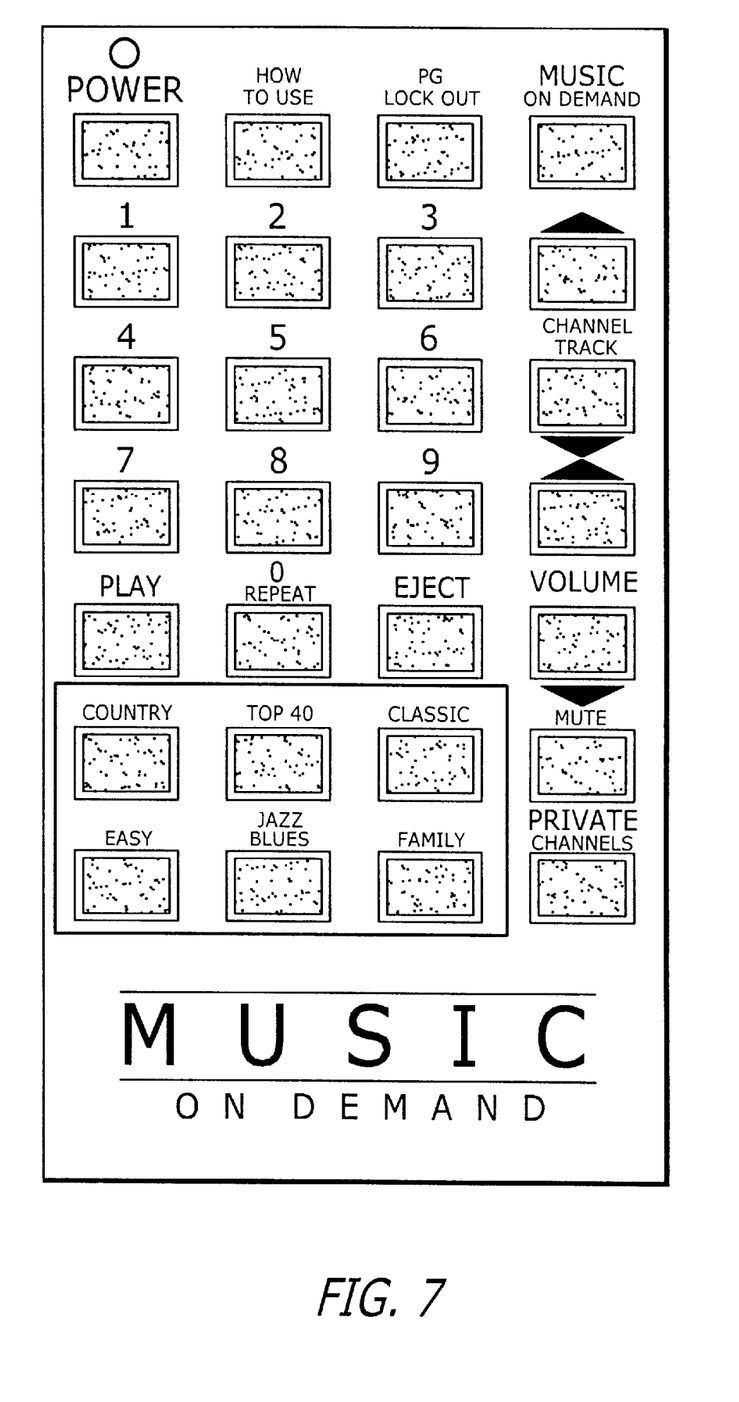
FIG. 7 is an example of one of many possible configurations of the buttons on the remote of FIG. 3.

The user may enter a selection through either the keyboard 62 on the front of the media player/dispenser 54 or through the remote control 58 such as that shown in FIG. 7. If the user presses the HOW TO USE button at anytime during operation, the FM tuner in the media player/dispenser 54 is automatically tuned to receive audio data from another one of the continuous-play players. This data may comprise instructions regarding the operation and features of the system. Again, because this audio data is stored in one of the continuous-play players, a user may not always access the data as the beginning. The user may, however, hear the entire data by allowing the data to repeat itself from the beginning.

If the user presses one of the six genre-specific music buttons, COUNTRY, TOP 40, CLASSICAL, EASY, JAZZ/BLUES or FAMILY, the FM tuner 92 in the media player/dispenser 54 is automatically tuned to receive audio data from the continuous-play player which is playing that genre-specific compilation. The microprocessor 74 generates and stores an access signal encoded with a room identifier unique for the in-room system 12 at which the user made his selection. The access signal also includes a media access identifier unique for the media accessed by the user. This access signal is subsequently transmitted to the system controller 18 in the head-end system 14. The transmission of this access signal may occur immediately after generation or it may be delayed until the system controller 18 polls each of the in-room systems 12 for access signals.

Once the signal is received by the system controller 18 it is processed to determine whether there is any charge associated with the acquisition. The system controller 18 includes a price look-up table. The media access identifier is correlated with the price look-up table to determine whether there is a charge. If there is a flat fee charge associated with the access the charge is added to the room bill, typically as a room service charge. If there is a duration charge associated with the access then the system controller 18 starts a timer for that in-room system 12 and continues running the timer until it receives a access-terminated signal from the microprocessor 74 indicating that the media is no longer being accessed. The system controller 18 then calculates the charge based on the duration and the price per unit time. This charge is added to the room bill. The microprocessor 74 may be programmed to provide a free sample period during which the user may access the media for a specified period of time before being charged by the system.

If the user presses the MUSIC ON DEMAND button or the PRIVATE CHANNELS button, the system 10 enters the interactive mode and the user is prompted to select one of the available on-demand access media for listening. Selection of the media may be accomplished by entering the number of the desired media. A list of available on-demand access media may be provided in the form of printed material placed near the in-room system 12. Alternatively, the available media may be displayed on the in-room system display 64. Upon selection of a media, the microprocessor 74 generates and stores an access signal encoded with a room identifier unique for the in-room system 12 at which the user made his selection. The access signal also includes a media access identifier unique for the media accessed by the user. This access signal is subsequently transmitted to the system controller 18 in the head-end system 14. As previously mentioned, the transmission of this access signal may occur immediately after generation or it may be delayed until the system controller 18 polls each of the in-room systems 12 for access signals.

Once the signal is received by the system controller 18 it is processed to 1) access the on-demand access media and 2) determine whether there is any charge associated with the acquisition. To access the media, the system controller 18 locates an available on-demand player 26 and forwards the media access identifier to the file server 24. The file server 24 then downloads the on-demand access-only media to the player 26. The player 26 then begins transmitting the media to the in-room system 12. With regard to pricing, the system controller 18 includes a price look-up table. The media access identifier is correlated with the price look-up table to determine whether there is a charge. If there is a flat fee charge associated with the access the charge is added to the room bill, typically as a room service charge. If there is a duration charge associated with the access then the system controller 18 starts a timer for that in-room system 12 and continues running the timer until it receives a access-terminated signal from the microprocessor 74 indicating that the media is no longer being accessed. The system controller 18 then calculates the charge based on the duration and the price per unit time. This charge is added to the room bill. The microprocessor 74 may be programmed to provide a free sample period during which the user may access the media for a specified period of time before being charged by the system.

In order to purchase acquisition media the user first gains access to the media by unlocking the front door. This may be accomplished with a push button, a remote control, or by calling the front desk. The user than selects the acquisition media he wants and removes it from the media dispenser 68. Upon removal, a sensor is activated and the microprocessor 74 records the removal/purchase. The system controller 18 periodically polls each in-room system 12 for removal/purchase records. When requested by the system controller 18, the microprocessor 74 relays the purchase record to the system controller which in turns bills the user for the purchase of the acquisition media as a room service charge. The microprocessor 74 may be programmed to provide for a free check-out period during which the user may remove a media from the media dispenser 68 and 1) either return it to the media dispenser within the check-out time to avoid a charge, or 2) keep it and thereby purchase it. Protection against unauthorized purchases may be guaranteed by requiring the user to enter an access code in order to make a purchase. An optional device may also be installed in the media dispenser 68 to prohibit the return of the media. As previously mentioned, the in-room system 12 may include a credit card swipe thus allowing for acquisition media to be purchased without it being charged to the room. In this configuration, the door is unlocked by the system controller 18 once credit card authorization is obtained.

If the user desires to prevent unauthorized access to media and/or acquisition of media he may lock the system by pressing the PG LOCK OUT button followed by a two digit locking code assigned to that in-room system 12. In the alternative, the system controller 18 may be programmed to provide for the blocking of specific pay channels or locking the door to the media dispenser 68.

The system controller 18 periodically provides access and acquisition data to the HPMS and the inventory control system 42. This allows for the tracking of the number of times each specific media is accessed or acquired. Based on this data, programming material may be created to better suit the demands of the users. In addition, an adequate inventory of acquisition media may be maintained.

Figure 8:
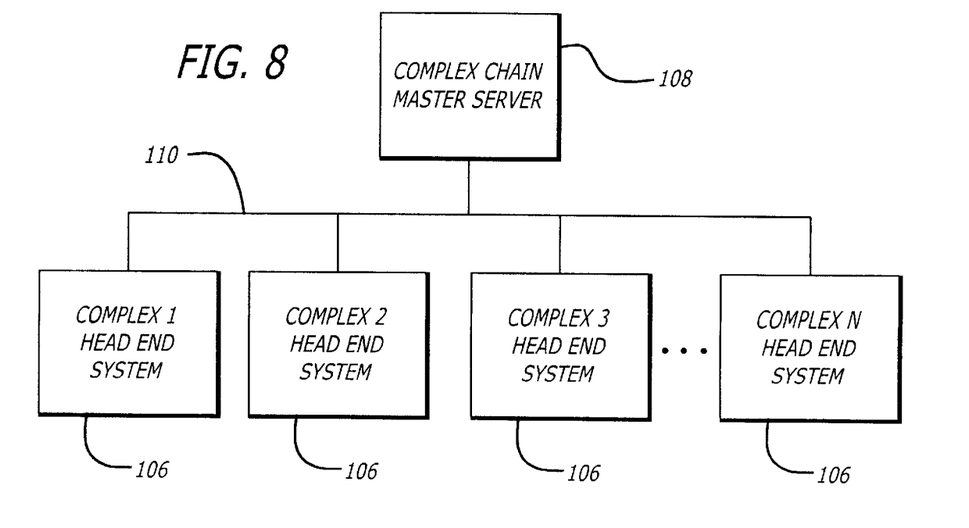
FIG. 8 is a block diagram depicting a complex chain master server interfacing with a plurality of complex head-end systems.

With reference to FIG. 8, the access-only media available within the system 10 may be periodically updated. Each individual complex 106 or hotel in a chain is accessible by the hotel chain master server 108 through a communications line 110, such as an Ethernet line. New access-only media may be downloaded over the Ethernet line 110 to each hotel 106 in a chain. This allows for automated, periodic update of access-only media and maintains uniformity among each hotel 106 in a chain. It also allows for data, such as program access and media sales information, from each individual hotel to be monitored and tracked by the master server. Of course, each hotel may add and/or remove access-only media from their file server 24 to better serve their guests.

It will be apparent from the foregoing that, while particular forms of the invention have been illustrated and described, various modifications can be made without departing from the spirit and scope of the invention. Therefore, it is not intended that the invention be limited, except as by the appended claims.

What is claimed is:

1. A method of providing media to a plurality of in-room systems from a head-end system remote from the plurality of in-room systems, said method comprising the steps of:

storing a plurality of acquisition media at each of the in-room systems each of the acquisition media having stored thereon, at least one of audio and video data;

storing a plurality of access-only media at the head-end system, the access-only media comprising at least one of audio and video data identical to that stored on the acquisition media;

at each in-room system, providing access to each of the access-only media, such that the access-only media is played by the head-end system and is at least one of audibly and visually presented at the in-room system to assist an in-room system user in media acquisition choices;

at the in-room system, sensing the removal of one of the acquisition media;

upon sensing the removal of one of the acquisition media, activating a check-out timer and storing an acquisition signal encoded with a room identifier and a media acquisition identifier at the in-room system;

monitoring the in-room system for the return of the removed acquisition media; and if the media is not returned within the check-out time allotted, transmitting the acquisition signal to the head-end system and processing the acquisition signal to determine any charge associated with the acquisition.

2. The method of claim 1 wherein the access-only media comprises a compilation of samples taken from the acquisition media.

3. The method of claim 1 wherein the step of processing the acquisition signal comprises the steps of:

storing an acquisition price look-up table at the head-end system; and charging the user the price associated with the acquisition.

4. The method of claim 1 further comprising the step of tracking the number of times an access-only media is accessed.

5. The method of claim 1 further comprising the step of tracking the number of times an acquisition media is acquired.

6. The method of claim 1 wherein the acquisition media comprises devices for storing audio/video data.

7. The method of claim 1 wherein the acquisition media comprises devices for storing audio/video data and the access-only media comprises audio/video data.

8. The method of claim 7 wherein the acquisition media comprises any one of a CD, DVD and a video cassette.

9. The method of claim 7 wherein the access-only media is stored on a DVD.

10. The method of claim 7 wherein the access-only media is stored in an audio/video card having memory.

11. The method of claim 1 wherein the acquisition media comprises devices for storing audio data.

12. The method of claim 11 wherein the access-only media is stored on a CD.

13. The method of claim 11 wherein the access-only media is stored in an audio card having memory.

14. A method of providing media to a plurality of in-room systems from a head-end system remote from the plurality of in-room systems, said method comprising the steps of:

storing a plurality of acquisition media at each of the in-room systems;

storing a plurality of access-only media at the head-end system;

at each in-room system, providing access to each of the access-only media to assist the user in media acquisition choices;

at the in-room system, sensing the access to one of the access-only media;

upon sensing the access of one of the access-only media, activating a free-sample timer and storing an access signal encoded with a room identifier and a media access identifier at the in-room system;

monitoring the in-room system for continued access to the accessed media;

if the accessed media is accessed throughout the free-sample time allotted, transmitting the access signal to the head-end system and processing the access signal to determine any charge associated with the access.

15. The method of claim 14 wherein the step of processing the access signal comprises the steps of:

storing an access price look-up table at the head-end system; and charging the user the price associated with the access.

16. A method of providing access-only media to a plurality of in-room systems from a head-end system remote from the plurality of in-room systems and tracking the access to the access-only media, said method comprising the steps of:

storing a plurality of access-only media at the head-end system;

transmitting each of the access-only media over a communications line, each access-only media transmitted at a unique frequency;

at each in-room system, providing access to the communication line through a frequency tuner for adjustably tuning to one of the unique frequencies;

at the in-room system, sensing the access to one of the access-only media;

upon sensing the access of one of the access-only media, activating a free-sample timer and storing an access signal encoded with a room identifier and a media acquisition identifier and monitoring the in-room system for continued access to the accessed media; and if the accessed media is accessed throughout the free-sample time allotted, transmitting the access signal to the head-end system and processing the access signal to determine any charge associated with the acquisition.

17. The method of claim 16 wherein the step of processing the access signal comprises the steps of:

storing an access price look-up table at the head-end system; and charging the user the price associated with the access.

18. The method of claim 16 wherein the access-only media comprises audio data.

19. The method of claims 16 wherein the access-only media comprises audio/video data.

* * * * *

UNITED STATES PATENT AND TRADEMARK OFFICE
CERTIFICATE OF CORRECTION

PATENT NO.    : 6,256,554 B1  
DATED         : July 3, 2001  
INVENTOR(S)   : Mark DiLorenzo Page 1 of 1

It is certified that error appears in the above-identified patent and that said Letters Patent is hereby corrected as shown below:

Column 9, claim 6,
Line 51, change "1", to read -- 11 --.
Line 52, delete "devices for storing audio/video data", and replace with -- any one of a CD, DAT, mini disc and cassette --.

Column 9, claim 11,
Line 63, after "data" and before "." add -- and the access-only media comprises data --.

Signed and Sealed this

Second Day of April, 2002

Attest:

JAMES E. ROGAN  
Attesting Officer     Director of the United States Patent and Trademark Office